(12) United States Patent
Jung et al.

(10) Patent No.: US 10,322,788 B2
(45) Date of Patent: *Jun. 18, 2019

(54) BALLAST WATER TREATMENT SYSTEM (71) Applicant: Techwin Co, Ltd., Cheongju, Chungcheongbuk-do (KR)

(72) Inventors: Boong Ik Jung, Chungcheongbuk-do (KR); Jung Sik Kim, Chungcheongbuk-do (KR); Hyun Su Shin, Daejeon (KR); Sun Duk Hwang, Daejeon (KR)

(73) Assignee: Techwin Co, Ltd., Cheongju, Chungcheongbuk-do (KR)

( * ) Notice: Subject to any disclaimer, the term of this patent is extended or adjusted under 35 U.S.C. 154(b) by 196 days.

This patent is subject to a terminal disclaimer.

(21) Appl. No.: 15/360,608

(22) Filed: Nov. 23, 2016

(65) Prior Publication Data
US 2017/0073057 A1 Mar. 16, 2017

Related U.S. Application Data (63) Continuation of application No. PCT/KR2015/005786, filed on Jun. 9, 2015.

(30) Foreign Application Priority Data
Jun. 26, 2014 (KR) .................. 10-2014-0079003

(51) Int. Cl.
B63J 4/00 (2006.01)
C25B 1/26 (2006.01)
(Continued)

(52) U.S. Cl.
CPC .......... B63J 4/002 (2013.01); B01D 19/0005 (2013.01); B01J 19/2475 (2013.01); B63B 13/00 (2013.01);
(Continued)

(58) Field of Classification Search
None
See application file for complete search history.

(56) References Cited

U.S. PATENT DOCUMENTS 4,171,350 A * 10/1979 Sanders .............. B01J 19/0006
376/301
4,374,116 A * 2/1983 Chuang .................. B01J 8/025
423/580.2
(Continued)

FOREIGN PATENT DOCUMENTS

CN 202430075 U 9/2012
CN 102800831 A 11/2012
(Continued)

OTHER PUBLICATIONS

Grigoriev et al, Hydrogen safety aspects related to high-pressure polymer electrolyte membrane water electrolysis, International Journal of Hydrogen Energy, vol. 34, No. 14, Jul. 2009, pp. 5986-5991 (Year: 2009).*

(Continued)

Primary Examiner — Harry D Wilkins, III
(74) Attorney, Agent, or Firm — Mintz Levin Cohn Ferris Glovsky and Popeo, P.C.; Kongsik Kim; Jhongwoo Jay Peck (57) ABSTRACT Disclosed is a ballast water treatment system including: a ballast water supply unit for supplying seawater employed as ballast water to a ballast water tank; an electrolysis device receiving a part of the seawater being supplied to the ballast water tank, and generating sodium hypochlorite and hydrogen gas as by-product gas by electrolyzing the part of the seawater being supplied to the ballast water tank via the ballast water supply unit; and a hydrogen gas removing device receiving a gas-liquid mixture of electrolyzed water and the hydrogen gas that are generated in the electrolysis device, removing the hydrogen gas by a catalyst reaction, (Continued)

and supplying remaining electrolyzed water to the ballast water tank via the ballast water supply unit.

13 Claims, 5 Drawing Sheets

(51) Int. Cl.
<table>
<tr><td>C02F 1/461</td><td>(2006.01)</td></tr>
<tr><td>C02F 1/467</td><td>(2006.01)</td></tr>
<tr><td>C25B 15/00</td><td>(2006.01)</td></tr>
<tr><td>C25B 1/04</td><td>(2006.01)</td></tr>
<tr><td>C25B 15/08</td><td>(2006.01)</td></tr>
<tr><td>B01J 19/24</td><td>(2006.01)</td></tr>
<tr><td>B63B 13/00</td><td>(2006.01)</td></tr>
<tr><td>B01D 19/00</td><td>(2006.01)</td></tr>
<tr><td>C02F 103/00</td><td>(2006.01)</td></tr>
<tr><td>C02F 1/02</td><td>(2006.01)</td></tr>
<tr><td>C02F 1/72</td><td>(2006.01)</td></tr>
</table>

(52) U.S. Cl.
CPC ............ *C02F 1/467* (2013.01); *C02F 1/4674* (2013.01); *C02F 1/46104* (2013.01); *C25B 1/04* (2013.01); *C25B 1/26* (2013.01); *C25B 15/00* (2013.01); *C25B 15/08* (2013.01); *C02F 1/02* (2013.01); *C02F 1/725* (2013.01); *C02F 2103/008* (2013.01); *C02F 2201/4617* (2013.01); *C02F 2201/4618* (2013.01); *C02F 2201/46145* (2013.01); *C02F 2209/29* (2013.01); *C02F 2303/04* (2013.01)

(56) References Cited

U.S. PATENT DOCUMENTS

| | | | | |
|---|---|---|---|---|
| 4,528,078 A | * | 7/1985 | Hirschfeld | ........... B01D 53/326 204/277 |
| 5,093,535 A | * | 3/1992 | Harrison | .................... B01J 8/02 554/141 |
| 5,725,781 A | * | 3/1998 | Bousquet | ................. B01J 21/18 210/757 |
| 6,126,811 A | * | 10/2000 | Barbier | ..................... C02F 1/20 204/253 |
| 6,619,054 B1 | * | 9/2003 | Cargnelli | ............. B01D 5/0021 62/317 |
| 2006/0113257 A1 | | 6/2006 | Fernandez et al. | |
| 2007/0142549 A1 | * | 6/2007 | Berti | ..................... C08F 279/04 525/53 |
| 2010/0219077 A1 | * | 9/2010 | Sohn | ..................... C02F 1/4674 204/666 |
| 2011/0114569 A1 | * | 5/2011 | Kim | ..................... C02F 1/4674 210/739 |
| 2012/0024784 A1 | * | 2/2012 | Clark | ................. B01D 19/0031 210/638 |
| 2016/0186340 A1 | * | 6/2016 | Tseng | ........................ C25B 1/26 204/274 |

FOREIGN PATENT DOCUMENTS

| | | | | |
|---|---|---|---|---|
| DE | 3735758 A1 | * | 5/1989 | ............ B01J 10/007 |
| JP | 55-092121 A | * | 7/1980 | ............. B01J 20/16 |
| JP | 1986-197404 A | | 9/1986 | |
| JP | 62-083301 A | * | 4/1987 | ............. B01J 23/40 |
| JP | H11333463 A | | 12/1999 | |
| JP | 2001-087765 A | | 4/2001 | |
| JP | 2004-027323 A | | 1/2004 | |
| JP | 2013-527798 A | | 7/2013 | |
| KR | 10-0883444 B1 | | 2/2009 | |
| KR | 10-0987220 B1 | | 10/2010 | |
| KR | 10-1289848 31 | | 7/2013 | |
| KR | 10-1296213 B1 | * | 8/2013 | ............. C02F 1/461 |
| WO | WO 95/24360 A1 | * | 9/1995 | ............. B01J 21/18 |
| WO | WO 2006048072 A1 | * | 5/2006 | ............. B01J 12/00 |

OTHER PUBLICATIONS

Machine translation of Jung et al (KR 101296213 B1) obtained at http://worldwide.espacenet.com on Aug. 10, 2018 (Year: 2012).*

* cited by examiner

BALLAST WATER TREATMENT SYSTEM

CROSS-REFERENCE TO RELATED APPLICATIONS

This is a continuation application of International Application No. PCT/KR2015/005786 filed on Jun. 9, 2015, which claims priority to Korean Application No. 10-2014-0079003 filed on Jun. 26, 2014. The applications are incorporated herein by reference.

TECHNICAL FIELD

The present invention relates generally to a ballast water treatment system employed for adjusting weight distribution of a vessel. More particularly, the present invention relates to a ballast water treatment system capable of removing hydrogen gas generated as a by-product during a process of electrolyzing seawater and producing a disinfectant solution to disinfect ballast water.

BACKGROUND ART

In recent years, as one of emerging techniques for sterilization and disinfection, a technique of electrolyzing brine or seawater, and producing an aqueous solution of sodium hypochlorite to be used as a disinfectant solution has been developed.

In other words, the electrolysis device is a device that electrolyzes brine or seawater and generates sodium hypochlorite (Sodium Hypochlorite; NaOCl). Here, the produced sodium hypochlorite can be used in sterilization of purification plants, sewage treatment plants, and swimming pools, and processing a coolant of a power plant or ballast water of a vessel.

When operating the device generating sodium hypochlorite, the brine or seawater is electrolyzed in an electrolysis module, thereby generating chlorine, hydrogen, and oxygen gases. Here, the chlorine gas is quickly dissolved in water ($H_2O$) or is reacted with hydroxide ions (OH), and is converted to hypochlorite. After that, the hydrogen and oxygen gases that are not dissolved in water are discharged to the atmosphere through a gas-liquid separator. Here, the hydrogen gas is explosive when concentration thereof is equal to or greater than 4%. Thus, the hydrogen is discharged by using an air blower capable of forcibly supplying air after dilution to a concentration of less than 4%.

As such, the device generating sodium hypochlorite always possess the inherent risk due to hydrogen gas generation. Thus, it requires that the hydrogen gas be removed so as to prevent the underlying risk.

However, in order to process the hydrogen gas produced as the by-product during electrolysis of the brine or seawater as described above, it requires installation of an additional gas-liquid separator, thereby causing an increase in installation costs and maintenance requirements. In particular, when the separator is applied to a conventional vessel, there is a problem in that it is difficult to implement a piping configuration, etc. due to limited installation space. In addition, it is essential that a line for discharging the hydrogen gas after dilution with ambient air be configured. Thus, there is a further problem in that the vessel should undergo structural modification, thereby causing an increase in installation time and costs.

SUMMARY

Accordingly, the present invention has been made keeping in mind the above problems occurring in the related art, and the present invention is intended to propose a ballast water treatment system capable of removing hydrogen gas generated during electrolysis by a catalyst reaction, and achieving miniaturization by reducing overall installation space and easy application to a vessel.

In order to achieve the above object, according to an aspect of the present invention, there is provided a ballast water treatment system including: a ballast water supply unit for supplying seawater that is be used as ballast water to a ballast water tank; an electrolysis device receiving a part of the seawater being supplied to the ballast water tank, and generating sodium hypochlorite and hydrogen gas as by-product gas by electrolyzing the part of the seawater being supplied to the ballast water tank via the ballast water supply unit; and a hydrogen gas removing device receiving a gas-liquid mixture of electrolyzed water and the hydrogen gas that are generated in the electrolysis device, removing the hydrogen gas by a catalyst reaction, and supplying remaining electrolyzed water to the ballast water tank via the ballast water supply unit.

Here, the hydrogen gas removing device may be connected to the electrolysis device and receives the gas-liquid mixture therefrom, and the hydrogen gas removing device may include: a catalyst reaction tank having therein a hydrophobic catalyst that generates water by the catalyst reaction with the hydrogen gas; and an ambient air supply unit supplying ambient air to the catalyst reaction tank.

Further, the catalyst reaction tank may include: a body; a hydrophobic catalyst provided inside the body; and an electrolyzed water discharge line discharging remaining electrolyzed water that remains after being processed in the body to the ballast water supply unit, in which the body may be provided with: a gas-liquid mixture inlet through which the gas-liquid mixture is introduced into the body; an electrolyzed water outlet through which the electrolyzed water is discharged from the body; an ambient air inlet through which ambient air including oxygen or air is introduced into the body; and a gas outlet through which remaining gas that remains in the body after the catalyst reaction is discharged from the body.

Further, the catalyst reaction tank may include: a body; a hydrophobic dividing plate dividing an inside of the body into a catalyst receiving part provided at a first side, and an electrolyzed water receiving part provided at a second side; and the hydrophobic catalyst received in the catalyst receiving part, and generating water by the catalyst reaction with the hydrogen gas.

Further, the electrolyzed water receiving part of the body is provided at a first side thereof with a gas-liquid mixture inlet through which the gas-liquid mixture is introduced, and at a second side thereof with an electrolyzed water outlet discharging the electrolyzed water, and the catalyst receiving part of the body is provided at a first side thereof with an ambient air inlet through which ambient air including oxygen or air is introduced, and at a second side thereof with a gas outlet through which remaining gas that remains in the body after the catalyst reaction is discharged.

Further, the hydrophobic catalyst is provided as a catalyst that oxidizes hydrogen gas and is supported on a porous hydrophobic support, and the hydrophobic support may consist of a porous hydrophobic polymer material, or an inorganic or metal material of which a surface is hydrophobically treated.

Further, the hydrophobic catalyst may be supported on one or opposite surfaces of the hydrophobic dividing plate, and may be integrally formed into a porous plate membrane structure or a tubular or hollow-fiber membrane structure.

Further, the hydrophobic dividing plate may be formed into a tubular shape, and the hydrophobic catalyst is formed into a tubular shape and at least one tubular-shaped catalyst is installed inside the hydrophobic dividing plate, such that the hydrophobic catalyst and the hydrophobic dividing plate may be formed into a tubular or hollow-fiber membrane structure.

Further, the hydrophobic support may be formed into one shape selected from the group consisting of bead, honeycomb, sheet, mesh, tube, and hollow-fiber shapes.

Further, the catalyst may be composed of one or more elements selected from the group consisting of platinum group metal elements (Pt, Pd, Ru, Ir, Rh, etc.) or transition metal elements (Ni, Cu, Fe, etc.).

Further, the seawater is allowed to pass via the hydrogen gas removing device while being supplied to the electrolysis device, and the ballast water treatment system may further include: a heat exchange device increasing a temperature of the seawater by heat exchange with a heat of reaction generated during the catalyst reaction in the hydrogen gas removing device, prior to supplying the seawater to the electrolysis device.

Further, the ballast water treatment system may further include: a residual chlorine measuring means measuring residual chlorine of the ballast water being introduced from the ballast water supply unit to the ballast water tank; and a control unit receiving a measured value from the residual chlorine measuring means, and controlling the amount of electrolysis in the electrolysis device and the amount of the ambient air in the ambient air supply unit so as to make the measured value satisfy a preset predetermined value.

According to the ballast water treatment system of the present invention having the above-described characteristics, it is possible to remove the hydrogen gas by the catalyst reaction by supplying the gas-liquid mixture of the electrolyzed water and the hydrogen gas produced as by-product gas to the catalyst reaction tank, without installation of the gas-liquid separator.

Therefore, the present invention can achieve a reduction in installation space, costs, and installation time.

Further, the present invention can achieve an increase in efficiency of electrolysis by increasing the temperature of the seawater by using the heat of reaction generated during the catalyst reaction. Therefore, the present invention can efficiently process the ballast water although seawater having a low temperature is supplied or seawater is supplied from a polar region.

DETAILED DESCRIPTION

Hereinafter, a ballast water treatment system according to an embodiment of the present invention will be described in detail with reference to accompanying drawings.

Figure 1:
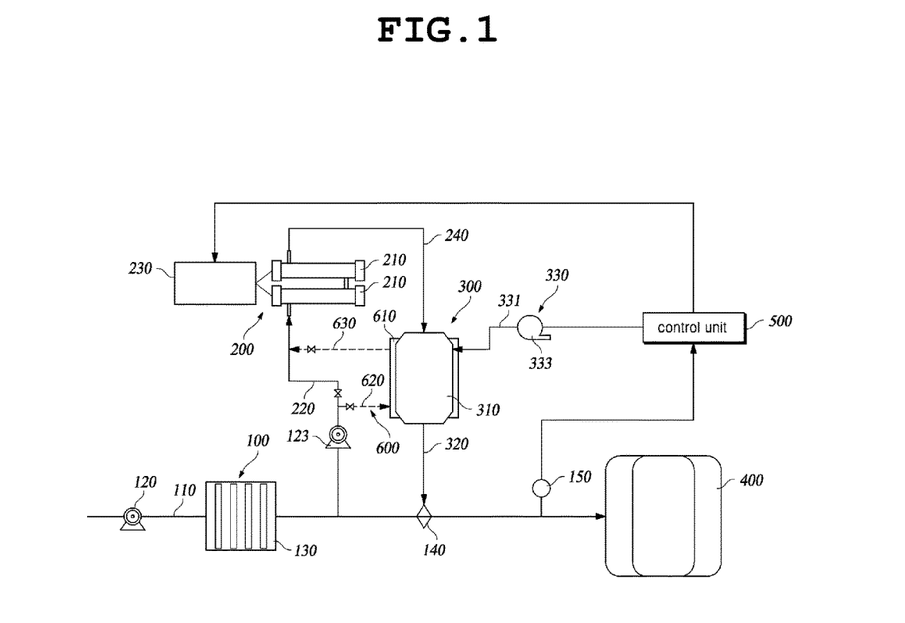
FIG. 1 is a schematic view illustrating a ballast water treatment system according to an embodiment of the present invention.
Figure 2:
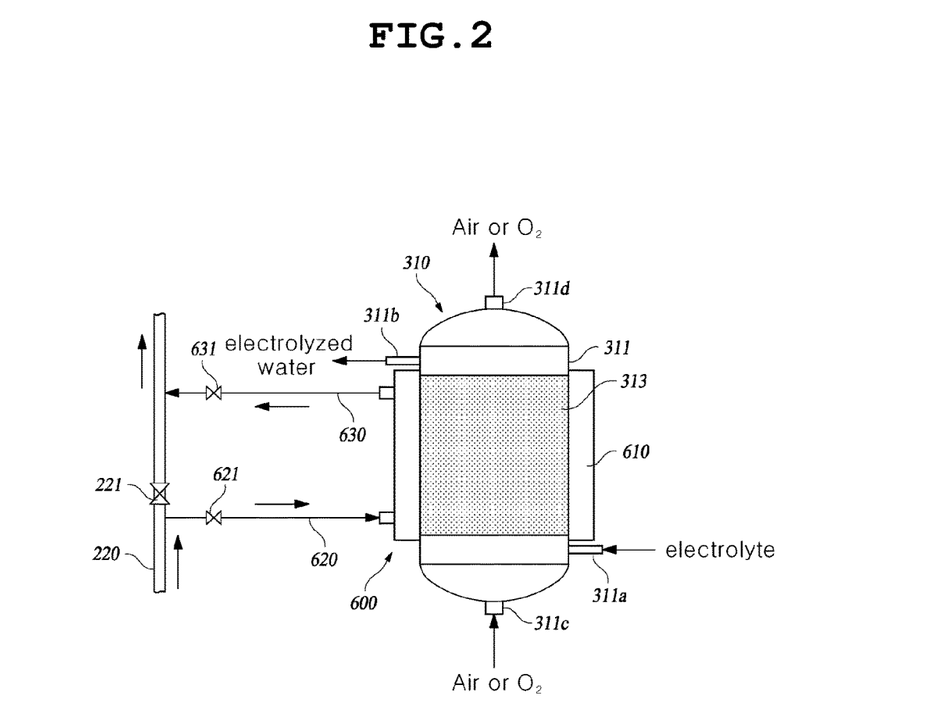
FIG. 2 is a view illustrating a hydrogen gas removing device of FIG. 1.

With reference to FIGS. 1 to 2, the ballast water treatment system according to an embodiment of the present invention is provided with a ballast water supply unit 100, an electrolysis device 200, a hydrogen gas removing device 300, a ballast water tank 400, and a control unit 500.

The ballast water supply unit 100 is provide with a main supply line 110 supplying ballast water to the ballast water tank 400, a first supply pump 120 installed on the main supply line 110, and a preprocessing filter 130 installed on the main supply line 110.

The main supply line 110 is installed to supply seawater employed as the ballast water, such that the seawater is pumped by the first supply pump 120 and is supplied to the ballast water tank 400. Further, the preprocessing filter 130 filters floating materials contained in the seawater supplied as the ballast water, or marine microbes having a comparatively large size, etc.

The electrolysis device 200 is provided with an electrolyzing tank 210, a seawater supply line 220 branched from a lower end of the preprocessing filter 130 and supplying the seawater to the electrolyzing tank 210, a rectifier 230 supplying DC electric power to a cathode and an anode of an electrode in the electrolyzing tank 210, and a gas-liquid mixture discharge line 240 through which a gas-liquid mixture of electrolyzed water electrolyzed in the electrolyzing tank 210 and hydrogen gas produced as by-product gas is supplied to the hydrogen gas removing device 300.

The electrolyzing tank 210 is provided with the cathode and the anode therein so as to electrolyze the seawater introduced into the electrolyzing tank 120 by being supplied electric power from the rectifier 230. In other words, the electrolyzing tank 210 generates an aqueous solution of sodium hypochlorite by electrolyzing the introduced seawater by a known electrolysis method, and generates hydrogen gas produced as by-product gas during electrolysis together with the aqueous solution of sodium hypochlorite. As such, the gas-liquid mixture of the hydrogen gas and electrolyzed water is supplied to the hydrogen gas removing device 300 via the gas-liquid mixture discharge line 240. Here, the electrolyzing tank 210 may be provided as one unit, or a plurality of units to be connected in series or in parallel.

Further, when a supply pressure of the seawater being supplied to electrolyzing tank 210 is low, the seawater supply line 229 may be configured with a second supply pump 123 installed, thereby supplying the seawater required for electrolysis from the main supply line 110 to the electrolyzing tank 210.

The hydrogen gas removing device 300 is for removing the hydrogen gas contained in the gas-liquid mixture until falling within an explosion range, and supplying the electrolyzed water, namely the aqueous solution of sodium hypochlorite as disinfectant, to the ballast water tank 400. The hydrogen gas removing device 300 is provided with a catalyst reaction tank 310 receiving the gas-liquid mixture from the gas-liquid mixture discharge line 240 and removing the hydrogen gas, an electrolyzed water discharge line 320 supplying electrolyzed water that remains after removing the hydrogen gas to the main supply line 110, and an ambient air supply unit 330 supplying ambient air to the catalyst reaction tank 310.

The catalyst reaction tank 310 is supplied with the gas-liquid mixture, and then removes the hydrogen gas by the catalyst reaction and discharges only the desired electrolyzed water (aqueous solution of sodium hypochlorite). Specifically, as shown in FIG. 2, the catalyst reaction tank 310 is provided with a body 311, and a hydrophobic catalyst 313 installed inside the body 311. Here, the body 311 is provided with a gas-liquid mixture inlet 311a through which the gas-liquid mixture is introduced into the body 311, an electrolyzed water outlet 311b through which the electrolyzed water is discharged from the body 311, an ambient air inlet 311c through which ambient air is introduced into the body 311, and a gas outlet 311d through which processed gas is discharged from the body 311. The gas-liquid mixture inlet 311a and the electrolyzed water outlet 311b are installed on the body 311 at opposite sides of the hydrophobic catalyst 313. Here, the electrolyzed water outlet 311b is connected to a storage tank 400, such that the electrolyzed water that remains after removing the hydrogen gas in the catalyst reaction tank 310 may be supplied to the storage tank 400.

The ambient air inlet 311c is installed at a position adjacent to the gas-liquid mixture inlet 311a, and supplies ambient air, namely air or oxygen ($O_2$) to inside the catalyst reaction tank 310. As such, the ambient air supplied through the ambient air inlet 311c enables easier reaction of the catalyst in the catalyst reaction tank 310, and supplies oxygen required for the catalyst reaction. Here, the ambient air inlet 311c is connected to the ambient air supply unit 300. Further, the gas outlet 311d is installed on the body 311 at the same side as the electrolyzed water outlet 311b, and discharges oxygen or air that remains after the catalyst reaction to the outside.

The hydrophobic catalyst 313 is contained in the body 311, preferably it may be configured as a catalyst that oxidizes hydrogen gas and is supported on a porous hydrophobic support. Here, the porous hydrophobic support may consist of a porous hydrophobic polymer material, or an inorganic or metal material of which a surface is hydrophobically treated. In particular, the porous hydrophobic polymer material may be composed of polytetrafluoroethylene (PTFE), polyvinylidene difluoride (PVDF), polypropylene (PP), styrene divinylbenzene copolymer (SDBC), etc. Further, such porous hydrophobic polymer material (hydrophobic catalyst) may be formed into a variety of shapes such as a bead, a honeycomb, a flat-sheet or hollow-fiber membrane shape, etc.

The catalyst is a catalyst that converts hydrogen and oxygen to water, and may be composed of one or more elements selected from platinum group metal elements (Pt, Pd, Ru, Ir, Rh, etc.) or transition metal elements (Ni, Cu, Fe, etc.).

The electrolyzed water discharge line 320 is connected to the main supply line 110 and supplies the electrolyzed water to the main supply line 110. Thus, the ballast water to be stored in the ballast water tank 400 can be disinfected and sterilized.

Herein, in order to automatically inject the required amount of the electrolyzed water, an automatic injector 140 may be installed at a conjunction between the electrolyzed water discharge line 320 and the main supply line 110.

The ambient air supply unit 330 is provided with an ambient air supply line 331 connected to the ambient air inlet 311c, and an ambient air supply means 333 such as a fan, a compressor, an oxygen generator, etc forcibly supplying the ambient air (oxygen or air) to the air supply line 331.

Further, the main supply line 110 is further provided with a residual chlorine measuring means 150 measuring residual chlorine introduced into the ballast water tank 400.

The residual chlorine measuring means 150 measures a residual chlorine value by using an ORP measuring device, a residual chlorine measuring device, etc. and transmits the measured value to the control unit 500. Then, the control unit 500 controls the amount of current of the rectifier 230 to make the measured value of the residual chlorine satisfy a preset predetermined value, thereby controlling the amount of the electrolyzed water (aqueous solution of sodium hypochlorite). Accordingly, the control unit 500 adjusts the amount of ambient air supplied by controlling the ambient air supply unit 330, thereby completely removing hydrogen gas.

Further, a heat exchange device 600 may be further provided for recovering heat generated during the catalyst reaction in the catalyst reaction tank 310 and heat generated during electrolysis in the electrolyzing tank 210, and increasing a temperature of the seawater by heat exchange prior to supplying the seawater to the electrolyzing tank 210.

The heat exchange device 600 is provided with a heat exchange unit 610 installed on the catalyst reaction tank 310, a seawater injection line for heat exchange 620 branched from a seawater supply line 220 and supplying seawater to an inlet of the heat exchange unit 610, and a seawater discharge line for heat exchange 630 connecting an outlet of the heat exchange unit 610 with the seawater supply line 220. The heat exchange unit 610 is configured to surround an outer surface of the catalyst reaction tank 310 and have a space therein for receiving the seawater. Preferably, the heat exchange unit 610 may have a spiral pipe structure where the heat exchange unit 610 spirally surrounds the outer surface of the catalyst reaction tank 310, or heat exchange unit 610 may pass through an inside of the catalyst reaction tank 310. As such, a configuration of the heat exchange unit 610 can be variable, thus the present invention is not limited by a specific configuration.

The seawater injection line for heat exchange 620 and the seawater discharge line for heat exchange 630 are respectively provided with valves 621 and 631 so as to control to selectively block or allow transport of the seawater. Further, a valve 221 is provided downstream of a junction between the seawater supply line 200 and the seawater injection line for heat exchange 620, such that the seawater is directly supplied to the electrolyzing tank 210 through the seawater supply line 220, or the seawater is bypassed via the heat exchange device 600, or the amount of the seawater bypassing via the heat exchange device 600 can be adjusted.

As such, by further installing the heat exchange device 600, when seawater is supplied during winter season or is supplied from near a polar region, the seawater is warmed by recovering the heat of reaction generated during the catalyst reaction and the heat of reaction generated during electrolysis in the catalyst reaction tank 310 prior to supplying the seawater to the electrolyzing tank 210. Thus, it is possible to increase a temperature of the seawater being supplied to the electrolyzed tank 210, thereby lengthening lifespan of the electrode and increasing efficiency of electrolysis.

Hereinafter, a ballast water treatment process using seawater by a ballast water treatment system having the above-mentioned configuration will be described.

First, the seawater is pumped by the first supply pump 120 and is supplied to the ballast water tank 400 through the main supply line 110. Here, the preprocessing filter 130 physically filters floating materials contained in the seawater supplied as the ballast water, and marine microbes having a comparatively large size, etc. After that, a part of the seawater passed through the preprocessing filter 130 is supplied to the electrolyzing tank 210 through the seawater supply line 220 branched from the main supply line 110.

Further, as described above, when the temperature is low or the seawater is supplied from near a polar region, a part or all of the seawater is warmed by recovering the heat of reaction in the catalyst reaction tank 310, prior to supplying the seawater to the electrolyzing tank 210.

In the mean time, electrolysis is performed in the electrolyzing tank 210 while DC electric power is supplied from the rectifier 230 to the anode and the cathode of the electrode installed in the electrolyzing tank 210. During electrolysis, chloride ions ($Cl^-$) are converted to chlorine gas ($Cl_2$) at the anode by electrolysis, and hydroxide ions ($OH^-$) and hydrogen gas ($H_2$) are generated at the cathode by electrolysis of water ($H_2O$). The generated chlorine gas and hydroxide ions chemically react with each other, thereby generating electrolyzed water in the form of hypochlorite ($OCl^-$). A gas-liquid mixture of the generated electrolyzed water and by-product gas is transferred to the catalyst reaction tank 310.

Next, hydrogen ($H_2$) of the gas-liquid mixture transferred to the catalyst reaction tank 310 reacts with oxygen ($O_2$) to thereby be converted into water ($H_2O$) by the catalyst reaction, such that hydrogen gas is removed in the catalyst reaction tank 310. Here, oxygen required for use in the catalyst reaction of by-product hydrogen gas is generated by a side reaction (water ($H_2O$) produces oxygen ($O_2$) and hydrogen ions ($H^+$) by an anode reaction) of the anode reaction during electrolysis in the electrolyzing tank 210. Such oxygen is generated by the side reaction, so the amount of the oxygen produced at the anode is smaller than the amount of hydrogen gas produced at the cathode. Thus, the amount of the oxygen produced at the anode is insufficient to react with all of the hydrogen gas. Accordingly, in order to replenish the insufficient amount of the oxygen, air or oxygen is supplied from the outside, namely through the ambient air supply unit 330, to the ambient air inlet 311*c*, thereby enabling the hydrogen gas produced as by-product gas to be fully removed.

In the meantime, in the embodiment of the present invention, a hydrophobic catalyst is employed as a catalyst, thus preventing wetting of the catalyst due to water produced by the catalyst reaction. Further, a liquid is further supplied during the catalyst reaction so as to reduce the heat of reaction by heat exchange, thus excluding the risk of explosion due to the heat of reaction. In other words, a widely used catalyst for a hydrogen reaction in the related art is supported on a hydrophilic carrier, so concentration of hydrogen is high. Thus, the conventional catalyst is problematic in that such a large amount of hydrogen results in increasing the converted amount of water, and the produced water causes wetting of the catalyst, thereby causing rapid degradation in reactivity of the catalyst. Further, the conventional catalyst is further problematic in that the heat of reaction generated during the catalyst reaction causes an increase in the risk of explosion. On the other hand, in the present invention, the hydrophobic catalyst is employed as the catalyst so it is possible to prevent degradation in reactivity of the catalyst by excluding wetting of the catalyst. Further, the liquid, namely electrolyzed water, is further supplied during the catalyst reaction so it is possible to reduce the heat of reaction through heat exchange.

As such, electrolyzed water that remains after removing the hydrogen gas in the catalyst reaction tank 310 is discharged through the electrolyzed water discharge line 320 and is injected to the main supply line 110 by the automatic injector 140. Thus, ballast water (seawater) is disinfected and sterilized prior to being supplied to the ballast water tank 400.

Further, the residual measuring means 150 measures residual chlorine of the seawater introduced into the ballast water tank 400, then the measured value is transmitted to the control unit 500. Then, the control unit 500 identifies whether the measured value of the residual chlorine satisfies a predetermined value. After that, the control unit 500 adjusts the amount of electrolysis by controlling the amount of the current of the rectifier 230. Accordingly, the control unit 500 adjusts the amount of ambient air supply by controlling the ambient air supply unit 330 so as to adjust the processing amount of hydrogen gas in the catalyst reaction tank 310.

Figure 3:
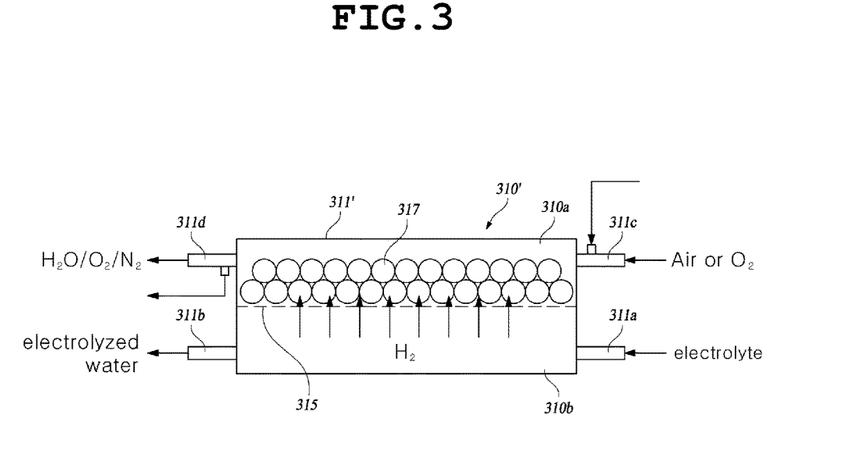
FIG. 3 is a view illustrating a hydrogen gas removing device according to another embodiment of the present invention.

Further, FIG. 3 shows a catalyst reaction tank 310' according to another embodiment of the present invention. The catalyst reaction tank 310' shown in FIG. 3 is provided with a body 311', a hydrophobic dividing plate 315 dividing an inside of the body 311' into a catalyst receiving part 310*a* and an electrolyzed water receiving part 310*b*, and a hydrophobic catalyst 317 received in the catalyst receiving part 310*a*.

The catalyst reaction tank 310' is divided into the catalyst receiving part 310*a* provided at a first side, and the electrolyzed water receiving part 320*b* provided at a second side by the hydrophobic dividing plate 233. The hydrophobic catalyst 317 is received in the catalyst receiving part 310*a*. The electrolyzed water receiving part 310*b* of the body 311' is provided at a first side thereof with a gas-liquid mixture inlet 311*a*, and at a second side thereof with an electrolyzed water outlet 311*b*.

Further, the catalyst receiving part 310*a* of the body 311' is provided at a first side thereof with an ambient air inlet 311*c* and through which ambient air (oxygen or air) is introduced inside the catalyst receiving part 310*a*. Further, the catalyst receiving part 310*a* of the body 311' is provided at a second side thereof with a gas outlet 311*d* and through which remaining gas (oxygen and nitrogen gases) that remains in the catalyst receiving part 310*a* of the body 311' after the catalyst reaction, and water produced after the catalyst reaction are discharged from the body 311'.

Here, a coolant, such as seawater, may be supplied together with the ambient air via the ambient air inlet 311*c* to the catalyst receiving part 310*a* so as to reduce the heat of reaction generated during the catalyst reaction. Preferably, the above-mentioned the seawater injection line for heat exchange 620 may be connected to the catalyst receiving part 310*a*, such that the catalyst receiving part 310*a* is directly heat exchanged. In this case, it is obvious that the gas outlet 311*d* is connected to the seawater discharge line for heat exchange 630.

Further, by the hydrophobic dividing plate 315, hydrogen gas of the gas-liquid mixture introduced into the electrolyzed water receiving part 310*b* is transferred to catalyst receiving part 310*a* provided at the first side of catalyst reaction tank 320, and electrolyzed water is discharged through the electrolyzed water outlet 311*b* via the electrolyzed water receiving part 310*b*. To this end, the hydrophobic dividing plate 315 is composed of a hydrophobic material having a porous structure capable of passing gaseous hydrogen while it does not pass liquid electrolyzed water.

The hydrophobic catalyst 317 has the same configuration and function as the above-described hydrophobic catalyst 313 shown in FIG. 2, so detailed description will be omitted below. The hydrophobic catalyst 317 of FIG. 3 is formed into a bead shape as an example. However, the hydrophobic catalyst 317 may be formed into a variety of shapes such as a bead, a honeycomb, a sheet, a mesh, a tube or hollow-fiber shape, etc. Further, the hydrophobic catalyst 317 may be formed into a shape the same as the hydrophobic dividing plate 315 and thereby may have a layer structure.

Figure 4:
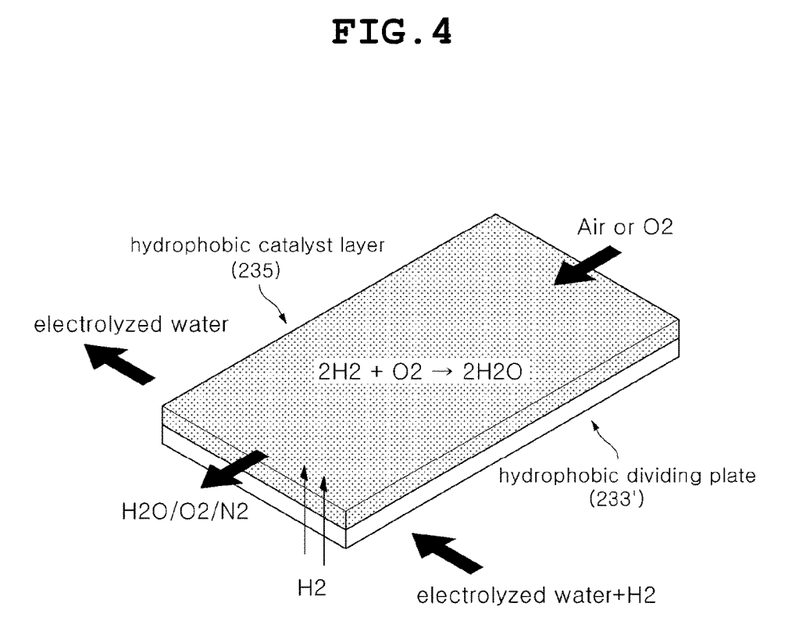
FIG. 4 is a view illustrating another example of a hydrophobic catalyst of FIG. 3.

Further, as shown in FIG. 4, a hydrophobic catalyst 235 may be supported on one or opposite surfaces of the hydrophobic dividing plate 233', so the hydrophobic catalyst 235 may be integrally formed into a porous plate membrane structure, or a tubular or hollow-fiber membrane structure.

Figure 5:
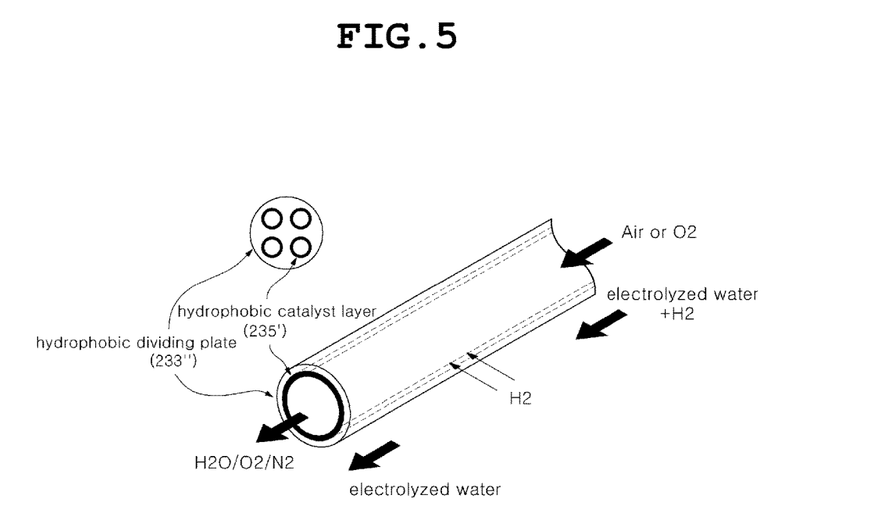
FIG. 5 is a view illustrating a further example of the hydrophobic catalyst of FIG. 3.

Further, as shown in FIG. 5, a hydrophobic catalyst 235 may be formed into a tubular or a hollow-fiber shape. In other words, the configuration, in which the ambient air passes inside a tubular-shaped hydrophobic catalyst 235', and one or more hydrophobic catalysts 235' are installed inside the tubular shaped hydrophobic dividing plate 233" so an electrolyte passes outside the hydrophobic dividing plate 233", may be adapted.

Further, the hydrophobic catalysts 313 and 317 provided in the catalyst reaction tanks 310 and 310' may be formed into a shape such as a bead or honeycomb, or a flat sheet membrane module having laminated layers, a spiral wound membrane module where the laminated flat membranes are wound around a cylinder, or a tubular membrane module filled with a plurality of tubular or hollow-fiber membranes.

As described above, according to the present invention, in the ballast water treatment system using seawater, when electrolyzing the seawater to produce the aqueous solution of sodium hypochlorite employed as disinfectant, hydrogen gas produced as by-product gas is transferred to the catalyst reaction tank without separation from electrolyzed water. Thus, the hydrogen is removed by the catalyst reaction, and the electrolyzed water is transferred to the place where it needed. Further, the present invention can achieve a reduction in installation time and space, and costs without provision of an additional gas-liquid separation means, a pipe configuration, etc., as in the related art, for discharging hydrogen gas.

Further, the present invention can achieve maximal securing safety by ultimately eliminating the hydrogen gas that always has the risk of explosion since it is locally accumulated in installation space or the piping having a complex configuration to discharge the hydrogen gas.

Further, the present invention can prevent wetting of the catalyst by using the hydrophobic catalyst to remove the hydrogen. Further, the electrolyzed water is further supplied to reduce the heat of reaction by heat exchange. Therefore, the present invention can prevent the risk of explosion caused by the heat of reaction.

Further, when seawater having the low temperature or seawater of the near polar region is supplied, the seawater is bypassed via the catalyst reaction tank so as to be warmed by heat generated during the catalyst reaction and heat generated during the electrolysis, prior to being supplied to the electrolyzing tank. Therefore, the present invention can achieve lengthening the lifespan of the electrode of the electrolyzing tank and increasing efficiency of electrolysis.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

<Description of the Reference Numerals in the Drawings>

| | |
|---|---|
| 100: ballast water supply unit | 110: main supply line |
| 120: first supply pump | 130: preprocessing filter |
| 140: automatic injector | |
| 150: residual chlorine measuring means | |
| 200: electrolysis device | 210: electrolyzing tank |
| 220: seawater supply line | 230: rectifier |
| 240: gas-liquid mixture discharge line | |
| 300: hydrogen gas removing device | |
| 310, 310': catalyst reaction tank | |
| 320: electrolyzed water discharge line | |
| 330: ambient air supply unit | 400: ballast water tank |
| 500: control unit | |

The invention claimed is:

1. A ballast water treatment system, comprising:
a ballast water supply unit for supplying seawater employed as ballast water to a ballast water tank;
an electrolysis device receiving a part of the seawater being supplied to the ballast water tank, and generating sodium hypochlorite and hydrogen gas as by-product gas by electrolyzing the part of the seawater being supplied to the ballast water tank via the ballast water supply unit;
a hydrogen gas removing device receiving a gas-liquid mixture of electrolyzed water and the hydrogen gas that are generated in the electrolysis device, removing the hydrogen gas by a catalyst reaction, and supplying remaining electrolyzed water to the ballast water tank via the ballast water supply unit;
a heat exchange device increasing a temperature of the seawater by heat exchange with a heat of reaction generated during the catalyst reaction in the hydrogen gas removing device, prior to supplying the seawater to the electrolysis device; and
at least one valve to adjust an amount of the seawater that flows through the heat exchange device,
wherein the hydrogen gas removing device includes a catalytic reaction tank which comprises:
a body;
a hydrophobic dividing plate that divides an inside of the body into a catalyst receiving part through which ambient air flows and an electrolyzed water receiving part through which the gas-liquid mixture flows; and
a hydrophobic catalyst disposed in the catalyst receiving part and generating water by the catalytic reaction of the hydrogen gas.

2. The ballast water treatment system of claim 1, wherein the hydrogen gas removing device is connected to the electrolysis device and receives the gas-liquid mixture therefrom, the hydrogen gas removing device further comprising:
an ambient air supply unit supplying the ambient air to the catalyst reaction tank.

3. The ballast water treatment system of claim 2, wherein the body comprises:
a gas-liquid mixture inlet through which the gas-liquid mixture is introduced into the body;
an electrolyzed water outlet through which the electrolyzed water is discharged from the body;
an ambient air inlet through which the ambient air including oxygen or air is introduced into the body; and
a gas outlet through which remaining gas that remains in the body after the catalyst reaction is discharged from the body.

4. The ballast water treatment system of claim 2, wherein the electrolyzed water receiving part of the body includes a gas-liquid mixture inlet at a first end thereof through which the gas-liquid mixture is introduced, and an electrolyzed water outlet at a second end thereof discharging the electrolyzed water, and the catalyst receiving part of the body includes an ambient air inlet at a first end thereof through which the ambient air including oxygen or air is introduced, and a gas outlet at a second end thereof through which remaining gas that remains in the body after the catalyst reaction is discharged.

5. The ballast water treatment system of claim 2, further comprising:
a residual chlorine measuring means measuring residual chlorine of the ballast water being introduced from the ballast water supply unit to the ballast water tank; and
a control unit receiving a measured value from the residual chlorine measuring means, and controlling the amount of electrolysis in the electrolysis device and the amount of the ambient air in the ambient air supply unit so as to make the measured value satisfy a preset predetermined value.

6. The ballast water treatment system of claim 1, wherein the hydrophobic catalyst is provided as a catalyst that oxidizes hydrogen gas and is supported on a porous hydrophobic support, the hydrophobic support consisting of a porous hydrophobic polymer material, or an inorganic or metal material of which a surface is hydrophobically treated.

7. The ballast water treatment system of claim 6, wherein the hydrophobic catalyst is supported on one or opposite surfaces of the hydrophobic dividing plate, and is integrally formed into a porous plate membrane structure or a tubular or hollow-fiber membrane structure.

8. The ballast water treatment system of claim 6, wherein the hydrophobic dividing plate is formed into a tubular shape, and the hydrophobic catalyst is formed into a tubular shape and at least one tubular-shaped catalyst is installed inside the hydrophobic dividing plate, such that the hydrophobic catalyst and the hydrophobic dividing plate are formed into a tubular or hollow-fiber membrane structure.

9. The ballast water treatment system of claim 7, wherein the catalyst is composed of one or more elements selected from a group consisting of platinum group metal elements (Pt, Pd, Ru, Ir, Rh, etc.) or transition metal elements (Ni, Cu, Fe, etc.).

10. The ballast water treatment system of claim 6, wherein the hydrophobic support is formed into one shape selected from a group consisting of bead, honeycomb, sheet, mesh, tube, and hollow-fiber shapes.

11. The ballast water treatment system of claim 1, wherein the heat exchange device surrounds an outer surface of the hydrogen gas removing device.

12. The ballast water treatment system of claim 11, wherein the heat exchange device includes a spiral pipe structure that spirally surrounds the outer surface of the hydrogen gas removing device.

13. The ballast water treatment system of claim 1, wherein the heat exchange device passes through an inside of the hydrogen gas removing device.

* * * * *